United States Patent [19]

Beatty

[11] 4,263,646

[45] Apr. 21, 1981

[54] MISSED COMMUTATION DETECTOR AND SAFEGUARD ARRANGEMENT

[75] Inventor: Brent A. Beatty, Louisville, Ky.

[73] Assignee: General Electric Company, Louisville, Ky.

[21] Appl. No.: 33,776

[22] Filed: Apr. 27, 1979

[51] Int. Cl.³ .......................................... H02H 7/122
[52] U.S. Cl. .................................... 363/58; 363/136; 361/86
[58] Field of Search .................. 363/27, 28, 50, 57-58, 363/96, 135-136; 323/21, 22 SC, 22 T; 361/86, 88, 100, 101

[56] References Cited

U.S. PATENT DOCUMENTS

| | | | |
|---|---|---|---|
| 3,569,819 | 3/1971 | Martzloff et al. | 363/58 |
| 3,814,888 | 6/1974 | Bowers et al. | 363/136 X |
| 3,821,630 | 6/1974 | Kornrumpf et al. | 363/96 X |
| 3,852,656 | 12/1974 | Bourbeau | 363/58 |
| 3,916,287 | 10/1975 | Brenneisen et al. | 363/57 |
| 4,065,802 | 12/1977 | Mizukawa et al. | 361/86 X |
| 4,068,294 | 1/1978 | Anderson et al. | 363/58 |
| 4,161,010 | 7/1979 | Mann et al. | 323/22 SC |

OTHER PUBLICATIONS

Henri Digneffe, "Characteristics and Applications of RCA Fast-Switching ASCR's", RCA Application Note AN-6456, 1/76, pp. 1-9.

Primary Examiner—William M. Shoop
Assistant Examiner—Peter S. Wong
Attorney, Agent, or Firm—Bernard J. Lacomis; Radford M. Reams

[57] ABSTRACT

A missed commutation detection circuit for use with a power inverter circuit which employs optically isolated gates to provide signals indicative of the state of a pair of SCR power switching devices. The gates are connected to combine the signals via a NOR logic arrangement to generate a missed commutation control signal whenever both of the SCR's are concurrently in a conductive or unblocked condition. The commutation control signal thus generated feeds a one-shot multivibrator which generates an isolation signal for a preselected time period. The isolation signal opens a normally closed current isolation switch connected intermediate the DC input bus and the inverter SCR's which cuts off current to the SCR's permitting them to return to their blocking state. After the duration of the isolation signal from the one shot, the isolation switch is again closed and the circuit is permitted to attempt normal operation. The inverter is again isolated from the DC supply upon recurrence of the missed commutation condition.

3 Claims, 1 Drawing Figure

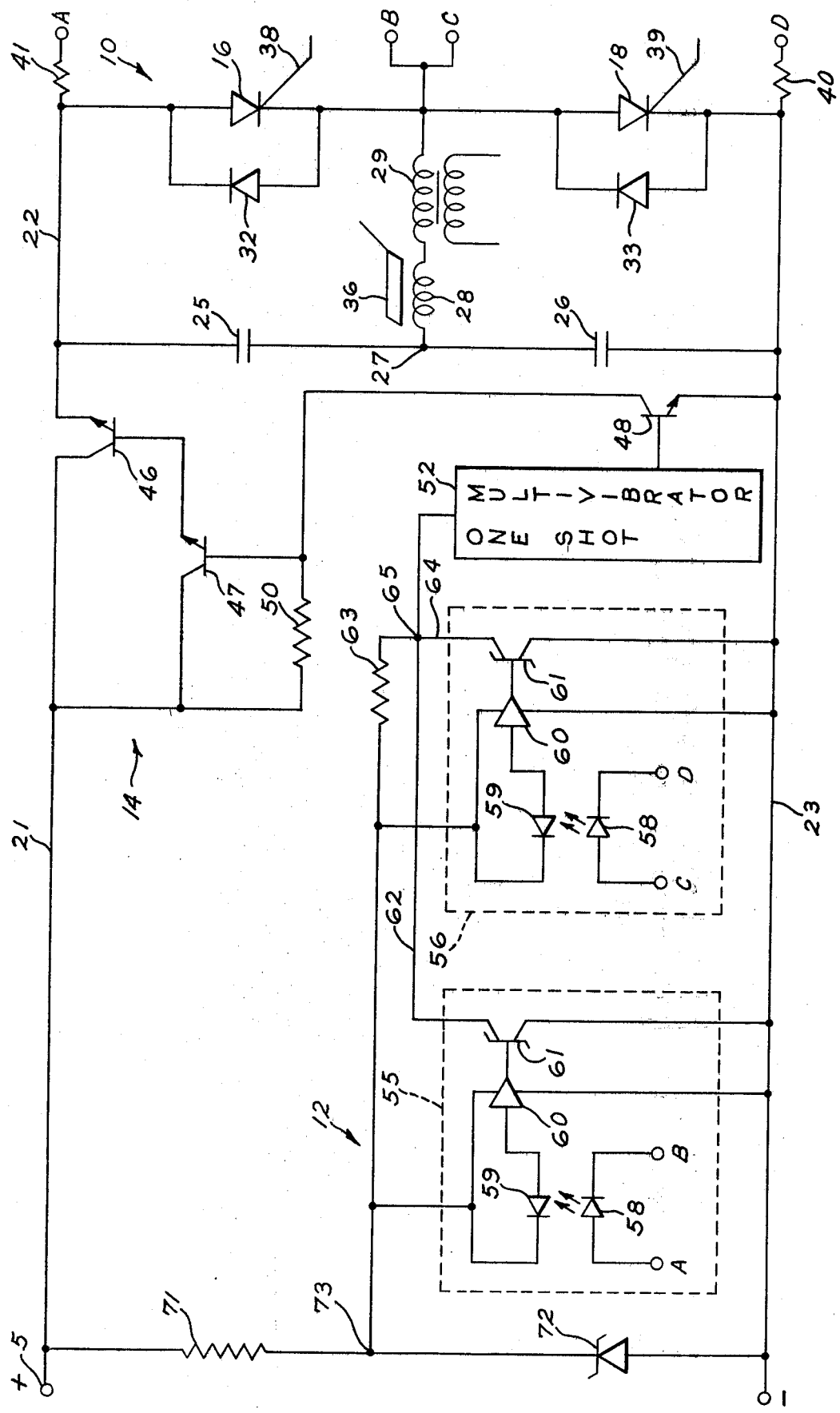

MISSED COMMUTATION DETECTOR AND SAFEGUARD ARRANGEMENT

BACKGROUND OF THE INVENTION

1. Field of the Invention

This invention relates to a circuit for providing rapid detection of a malfunction in the form of a missed commutation in an inverter circuit of the type used in induction cooking or heating systems in order to temporarily interrupt the operation of the inverter until the cause of the malfunction is removed to prevent damage to critical circuit components.

2. Description of the Prior Art

One well known induction cooking system is disclosed in U.S. Pat. No. 3,814,888, and utilizes inverter circuits to convert DC power supply voltage to an ultrasonic output frequency wave for driving an induction heating coil. The inverter circuit utilizes a pair of controlled solid state power devices which are rendered conductive alternately for intervals of conduction at a rate to produce the ultrasonic output frequency wave. In such an arrangement if a commutation failure occurs in one of the solid state power devices the result is a short circuit across the DC bus at the inverter input. Some means must be provided to open this short or to isolate the inverter in order to prevent destruction of the power control devices and other circuit components. A similar inverter circuit for use as an induction cooking control is discussed in RCA Application Note AN-6456.

One common method used to protect against missed commutations in an inverter is a fast-acting fuse. However, since the blown fuse requires a maintenance action to restore operation of the inverter, it can only be employed in connection with a circuit design in which commutation failures are very infrequent. Such systems require that a large margin be provided in the energy storage components to assure that commutation will reliably occur even during transients in source voltage or load impedance. These systems are consequently excessively expensive.

Other prior art systems for preventing commutation failure employ sophisticated detection schemes which require dual isolated power supplies, operational amplifiers and a comparator. Such systems are impractical for use in high volume applications such as induction cooking ranges where load impedance is very erratic, reliability without maintenance is essential and economic factors prevent the use of large margin components.

In U.S. Pat. No. 4,068,294, there is disclosed a circuit for detecting a missed commutation in an inverter by, in effect, measuring the time lapse between the occurrence of a turn-on triggering pulse to a turned-off SCR and a sensed turn-off of the non-triggered SCR. This arrangement uses a photodiode and phototransistor which operates as an optoisolator, and contemplates a period when two SCR's which are connected across the DC bus in the same leg of the inverter are concurrently on and is different in this respect from the invention disclosed herein. The timing measurement of this patent is accomplished by an ANDing circuit which provides a disconnect signal if the series-connected SCR's in the same leg of the inverter are both ON a preselected time after the occurrence of the turn-on trigger pulse to one of the SCR's. Because it requires a very expensive center tapped commutating interval current limiting reactor and additional components, it is not economically feasible for high volume production.

In U.S. Pat. No. 3,821,630, there is disclosed a commutation failure detection scheme comprising only a single power switching device. This arrangement uses a current switch in series with the switching device which is switched concurrently with the SCR. A comparator is used to continuously monitor the instantaneous voltage across the SCR. Trigger pulses to the current control device are inhibited when the voltage across the SCR is above a predetermined reference level.

OBJECTS AND SUMMARY OF THE INVENTION

A primary object of the invention is the provision of an inexpensive circuit for detecting an inverter malfunction caused by a missed commutation and generating a signal indicative thereof.

Another object of the invention is the provision of a circuit which is capable of responding to a signal indicative of a commutation failure in an inverter to cause the power switching devices of the inverter to be temporarily decoupled from the DC bus lines, to recouple the power switching devices to the DC bus after a preselected time, and to again decouple the inverter if the commutation failure recurs.

A further object is to provide a simple detection scheme for detecting commutation failures in inverter circuits having a pair of series connected power switching devices which operates by continuously sensing the instantaneous voltage across the solid state power devices and isolating the inverter from the DC bus upon detection of a missed commutation condition.

A further object is to provide a circuit which responds to the detection of abnormal voltage conditions across a pair of inverter power switching devices to force the current through these devices a zero for a predetermined time period, after which current is allowed to return to normal and the circuit is allowed to continue its operation if the commutation failure conditions do not recur.

These and objects and aims of the invention are accomplisted by a missed commutation detection and safeguard circuit for use with a power inverter circuit which employs optically isolated gates to provide signals indicative of the state of a pair of SCR power switching devices. The gates are connected to provide an NOR logic function which generates a missed commutation control signal whenever both of the SCR's are concurrently in a conductive or unblocked condition. The commutation control signal thus generated feeds a one-shot multivibrator which generates an isolation signal for a preselected time period. The isolation signal opens a normally closed current isolation switch connected intermediate the DC input bus and the inverter SCR's which cuts off current to the SCR's permitting them to return to their blocking state. After the duration of the isolation signal from the one shot, the isolation switch is again closed and the circuit is permitted to attempt normal operation. The inverter is again isolated from the DC supply upon recurrence of the missed commutation condition.

BRIEF DESCRIPTION OF THE DRAWINGS

The drawing is an overall circuit diagram, partly in block form, which illustrates the operation of the missed commutation detection and safeguard circuit in a well known induction heating inverter circuit system.

DESCRIPTION OF THE PREFERRED EMBODIMENT

Referring to the drawing, the invention is seen to generally comprise a self-commutating inverter circuit 10, a commutation failure detection circuit 12 and a series coupled inverter isolation circuit 14.

The overall operation of the inverter circuit 10 in an induction cooking apparatus is more completely described in U.S. Pat. No. 3,814,888 and in RCA Application Note AN-6456 referred to hereinbefore. Inasmuch as the inverter is well known in the art, it will be only briefly described hereinafter.

The inverter circuit 10 is intended for operational energization from a single phase commercially available 60 Hz, 110 V or 240 V source of alternating current (not illustrated), but of course can be designed for use with other types of low frequency, low voltage sources. This alternating current source is coupled in turn to a conventional static power converter (not shown) usually comprising a standard rectifier and filter combination arrangement to provide an appropriate DC voltage at terminals 5 and 6, which DC voltage is applied by bus line 21, solid state switch 46, and bus lines 22 and 23, to the inverter 10.

The inverter circuit 10 is comprised of first and second gate controlled power switching devices in the form of SCR's 16 and 18 coupled in series with each other across DC bus lines 22 and 23. The anode of the SCR 16 is coupled to the +DC supply terminal 5 via conductor 22, switch 46 and conductor 21, while the cathode of the SCR 18 is coupled to the —DC supply terminal 6 via line 23. The cathode of SCR 16 and the anode of SCR 18 are coupled to each other at junction point 20.

Also connected in series between bus lines 22 and 23 are commutating capacitors 25 and 26 which each have a terminal connected to junction point 27. Coupled between the junction points 20 and 27 is an induction heating work coil 28 and the primary of a current transformer 29. The current transformer 29 operates to monitor the direction and level of current through the work coil 28 and to trigger the generation of trigger pulses which control the SCR's 16 and 18. The operation of the current transformer for this purpose is well understood and does not form a part of this invention. The heating coil 28 is diagrammatically illustrated in the drawing as being cylindrically wound, but in a practical induction cooking unit would consist of a single layer, annular, tightly-wound, flat, spiral coil. The load or cooking utensile 36 is supported in a horizontal position (usually by a non-metallic cooktop surface) immediately above the work coil 28. The cooking utensil 36 may theoretically be made of any metal. Most efficient operation dictates the use of magnetic materials of preselected shape and size for use in making the cooking utensil.

The SCR's 16 and 18 are spanned by oppositely poled, reverse conducting diodes 32 and 33, respectively, which function in a well known manner to aid in commutating their associated SCR's.

Briefly, the operation of the inverter 10 is as follows: Assuming that the transistor 46 is conducting, if a positive going trigger pulse is applied to the gate 38 of the SCR 16, capacitor 25 will discharge into the SCR 16 and the coils 28 and 29. The series resonant combination of capacitor 25, and coils 28 and 29, produces thereafter a positive going sinusoidal half wave current. At the end of the positive going half wave, current reverses its direction and flows through the diode 32, this latter action resulting in a turnoff of the SCR 16. Soon after turnoff of the SCR 16, approximately five microseconds, a trigger pulse is applied to the gate 39 of SCR 18, which renders it conductive, which permits capacitor 26 to discharge through coils 28 and 29 and SCR 18. This produces an oppositely directed current half wave pulse through the coils 28 and 29, which reverses after half cycle. As this half wave falls to zero, current flows through diode 33 and SCR 18 is turned off. The cycle is now repeated by reapplication of a trigger pulse to SCR 16.

It should be noted that since the coil 28 is magnetically coupled to the metallic cooking utensil 36, the reversing field causes generation of heat therein in the known manner. A specific trigger generating circuit suitable with such arrangement is disclosed in detail in the aforementioned RCA application note.

Thus, during normal operation, the SCR's 16 and 18 are turned on alternately with one being turned off or non-conductive at all times. It is apparent from the drawing that if both of the SCR's 16 and 18 are conductive simultaneously, a substantial short circuit would be presented across the DC bus lines, probably resulting in damage to the SCR's or other circuit components. This condition is commonly described as a missed commutation condition, since it results from one of the SCR's failing to be turned off or returned to its blocking state.

In order to prevent the short circuit condition, a missed commutation circuit 12 is provided which is continuously monitors the voltages across the SCR's. The missed commutation circuit generates a control signal which operates a one-shot multivibrator 52 whenever the SCR's are concurrently in their conductive states. The one shot 52, in turn, functions to temporarily open a normally closed isolation switch 46 to isolate the inverter SCR's from the DC bus line.

More specifically, the missed commutation detector circuit 12 comprises a pair of optically isolated gates 55 and 56. The gates 55 and 56 are identical in makeup and may consist of Part. No. 5082-4360 integrated circuit gates available from the Hewlett-Packard Company. The gates 55 and 56 functionally comprise a photon emitting diode 58, a detector 59, a high gain amplifier 60 and a Schottky clamped open collector output transistor 61. The detecter 59 feeds the amplifier 60 which in turn drives the transistor 61 into either a conductive or non-conductive state, depending on the output of the diode 58.

The input terminals of the gate 55 are connected across the SCR 16 by connection to the circuit points A and B. In like manner, input terminals C and D of the gate 56 are coupled across the SCR 18 by connection to points C and D in the inverter. Protective resistors 40 and 41 are used to prevent damage to the gates.

The resistor 71 and zener diode 72 are coupled in series across the DC bus lines 21 and 23 to provide a regulated DC voltage at point 73 for operation of the missed commutation detector 12.

The output of the gate 55 on line 62 and the output of the gate 56 on line 64 are tied together at point 65 to one side of a resistor 63, the other side of the resistor 63 being coupled to the regulated DC voltage at point 73.

The isolation circuit 14 comprises a transistor 46 having its main current conducting terminals connected into the DC bus formed by lines 21 and 22. The transistor 46 is operated as a switch, the state of transistor 46 being controlled by transistors 47 and 48 and by the one-shot multivibrator 52. The transistor 46 is held in a conductive or closed condition during normal operation of the inverter and is switched to a non-conductive high impedance state in response to a missed commutation condition.

During normal operation of the inverter circuit, i.e., with the SCR's 16 and 18 being alternately triggered and proper commutation taking place, either SCR 16 or SCR 18 is in a high impedance blocking state. When SCR 16 is in a high impedance state, the voltage between points A and B is high, photodiode 58 is emitting, and transistor 61 is conductive, thereby holding point 65 at a low or ground level potential.

Likewise, if SCR 18 is in a blocking state, the voltage across voltage points C and D, and consequently the input to gate 56, is high. This results in transistor 61 being rendered conductive and holding of point 65 at a low logic level. Thus, with either of the transistors 61 conductive, the input to the one shot 52 is low, its output is therefore low, transistor 48 is off, and the transistors 47 and 46 are conductive. The DC input voltage across the inverter 10 is thereby maintained.

If both of the SCR's are concurrently conductive, the transistors 61 of gates 55 and 56 are cut off and point 65 is pulled positive by the DC voltage at point 73. The positive voltage at point 65 triggers the one shot 52 which produces a positive going pulse for a preselected time (preferably about one second) to the input of transistor 48, turning it on. This in turn diverts current from transistor 47, which turns off, and in turn renders transistor 46 non-conductive. Thus, the DC supply to the inverter is cut off or isolated. This condition persists for a duration determined by the output of the multivibrator 52. In the preferred embodiment, a RCA-CD4098B dual monostable multivibrator is employed in which an external resistor and capacitor are employed to control the duration of the output trigger pulse.

When the output of the one shot 52 returns to a low level, transistor 48 is again cut off, thereby returning transistor 46 to its on state and allowing DC voltage to be applied to the inverter 10.

Thus, it can be seen that the combination of gates 55 and 56 operates as an NOR logic arrangement. More specifically, if either SCR 16 or SCR 18, or both, are in a blocked or high impedance state, the output point 65 will be at a low logic level or essentially the voltage on bus line 23. Under these conditions, the multivibrator 52 remains untriggered, transistor 48 is non-conductive and transistor 46 is conductive. So long as the above NOR logic condition is satisfied, the DC bus remains coupled to the inverter 10 and power is delivered to load coil 28. However, if the original commutation failure condition (both SCR's turned on) occurs, the transistor 46 is again cut off. This process repeats until the commutation of the SCR's returns to normal.

While the invention has been particularly shown and described with reference to a preferred embodiment thereof, it will be understood by those skilled in the art that various changes in form and details may be made therein without departing from the spirit and scope of the invention.

What is claimed is:

1. An improved direct current to alternating current inverter comprising:
    a pair of gate controlled semiconductor switching devices coupled in series with each other across a source of DC voltage,
    missed commutation detection means coupled to each of said devices for generating a control signal upon the concurrence of preselected short circuit conditions across said devices, said missed commutation means comprising a pair of gates forming an ORing logic arrangement, each gate responding to the instantaneous voltage across each of said devices, said control signal being produced whenever both of said devices concurrently exhibit a low voltage thereacross,
    normally closed current controlling switch means coupled intermediate said devices and said source and responsive to said control signal to isolate said DC voltage from said devices, and
    timer means responsive to said control signal for generating a switching signal, said switching signal operative to open said current controlling switch for a preselected time and to reclose said switch after the passage of said preselected time, whereby current through said inverter is electrically isolated from said source in response to a missed commutation and recoupled thereto a preselected time thereafter.

2. The combination recited in claim 1 wherein said gates are optically coupled to said devices.

3. The combination recited in claim 2 wherein said switch comprises a transistor having its main current carrying terminal in series with said devices, and having a control terminal coupled to said timer means.

* * * * *